United States Patent Office 2,808,294
Patented Oct. 1, 1957

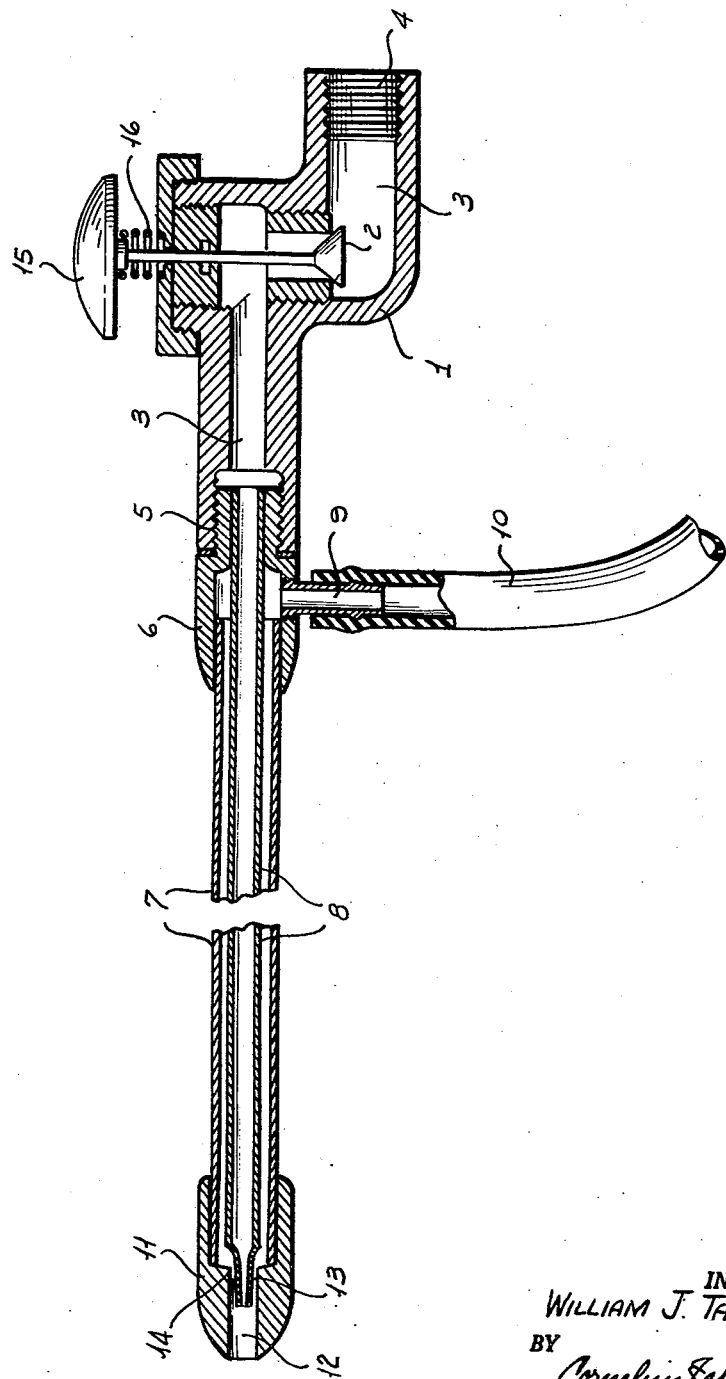

2,808,294

FOGGING APPARATUS

William J. Tamminga, Goshen, N. Y., assignor to Wiz-Products, Inc., Goshen, N. Y., a corporation of New York Application October 23, 1953, Serial No. 388,016

1 Claim. (Cl. 299—140)

This invention relates to a method of sterilizing and disinfecting food handling equipment and apparatus for practicing the same. The method and device of this invention are adapted for general application, but intended primarily for use in connection with the handling and transportation of milk.

Of all foods, milk is probably one of the most susceptible to contamination by pathogenic and putrefactive bacteria and stringent laws are in force in practically all communities to minimize the action of the same from the time the milk is produced until it is delivered to the ultimate purchaser. The milk handling industry utilizes large quantities of disinfecting and sterilizing agents in connection with their milk handling equpment and their milk transportation facilities. All milk handling apparatus, conduits and tank trucks are disinfected and sterilized and the technique of these operations is carried out with the utmost care.

Experience has shown that there is certain equipment, such as the interior of closed vessels, tanks and tank trucks, that cannot be economically or efficiently rendered sterile because of their structures which cannot be readily reached by hosing or mechanically treated by any of the other methods heretofore commonly used in the industry.

The object of the present invention is to provide a method of and device for carrying out effective and complete sterilization in a simple, efficient and economical manner.

I am able to accomplish these results by generating or producing an extremely fine aerated dispersion of a disinfectant in the form of a fog, with the dispersed aqueous solution in such finely divided form that it will float in the atmosphere as mist and, as such, will penetrate all parts of the innermost recesses of closed vessels and containers. By so doing, such closed spaces may be entirely filled with the fog which comes into intimate contact with each and every portion of the surface thereof. Upon contact with the surface, the fog-like mist condenses thereon to form over and upon such surfaces a continuous film or pellicle of the disinfecting solution and thus insure a thorough disinfecting treatment.

The invention has been found particularly useful in the sterilization and disinfecting of large tanks, especially the interiors of holding tanks and tank trucks which have heretofore presented an extremely difficult problem of sanitization. In utilizing this invention in this connection, it has been found thoroughly practical and highly efficient to introduce the fog through an appropriate opening in the tank. When thus introduced through such an opening, the interior of the tank becomes filled with fog and a complete treatment is assured. The same general practice may be carried out by introducing the fog through an opening of any other closed receptacle, container or equipment.

Aqueous solutions of chlorine are widely used in the dairy business. The same solutions may be used in carrying out the present invention, these solutions being converted into a fog through the use of the device which also forms the subject matter of this invention. This device is shown in central longitudinal section in the accompanying drawing, wherein:

Fig. 1 is a central longitudinal section of a fog producing device embodying the present invention and adapted to carry out the method thereof.

Referring to the drawing, 1 designates a valve housing comprising a control valve 2, positioned intermediate the ends of a passage 3, extending longitudinally through the valve housing. One end of this passage is threaded as at 4 for connection therewith to an appropriate supply of compressed air. The other end of the passage 3 is threaded as at 5 to receive a fitting 6. This fitting supports two concentric tubes, the outer of which is designated 7, while the inner is designated 8. The inner end of the inner tube 8 is in alinement with and communicates with the passage 3 of the valve housing, while the interior of the outer tube 7 is in communication with the interior of a nipple 9 to which is attached one end of a flexible hose 10, the distant end of which is adapted to be immersed in, e. g., an aqueous solution of chlorine contained in any appropriate supply receptacle.

The outer end of the outer tube 7 carries a fitting 11 having therethrough a passage 12 and into this passage extends a corresponding end of the inner tube 8 which is there contracted to form a nozzle 13, which extends well into the passage 12. The nozzle 13 is contracted, as stated, to form a relatively small discharge outlet opening, so as to discharge air therethrough at high velocity. It will be noted from Fig. 1 that the spacing between the wall of the passage 12 and the nozzle indicated at 14 is extremely close to form an orifice of relatively small cross sectional area, so that the feed of the disinfecting solution therethrough is meager.

The valve 2 is operable by a push button 15 which, when pressed, acts against a spring 16 to unseat the valve 2 and allow compressed air to enter and pass through the valve housing and through the inner tube 8, to be discharged through the passage 12 of the fitting 11. An injector action is thus set up within the fitting 11 with the result that the disinfecting agent is drawn through the tube 10 into the annular passage between the inner and outer tubes 8 and 7, respectively, and commingled within the passage 12 with compressed air passing at high velocity through such passage. The openings through which the air and liquid pass are relatively small and the velocity of the air is high and consequently the liquid is broken up into an extremely fine dispersion in the air current and is discharged from the fitting 11 in the form of a fine mist, so fine in fact that it floats in the atmosphere and forms the fog to which I have referred. Experience has shown that, if this invention is employed, e. g., by inserting the fitting 11 into an opening in a closed space and the valve 2 then unseated, the resulting fog may be fed into the space to entirely fill the same and deposit upon its surfaces the sanitizing and disinfecting film, as hereinbefore described.

The present invention has many important aspects. It will positively insure the complete sterilization and disinfecting of the surfaces to which it is applied. It will insure the filming of the disinfectant over all portions of the surfaces to which the fog is exposed. The disinfecting operation may be carried out completely and thoroughly in contradistinction to the hit and miss practices heretofore employed. Furthermore, it is economical and saves many man hours in carrying out the disinfecting operation. The apparatus employed is simple. The parts are fixed and non-adjustable and cannot be tampered with in such manner as to interfere with the proper fog formation.

The foregoing detailed description sets forth the preferred practical form of the invention, but the invention

Having thus fully described the invention, what I claim as new and desire to secure by Letters Patent is:

A device for producing fog which comprises: a valve having a compressed air passage, a normally closed control valve in said passage having a push button exteriorly of the housing for unseating said valve, an inlet fitting screwed into one end of the passage and having therein a chamber, a liquid inlet leading directly into said chamber intermediate the ends of said fitting, an outer tube the rear end of which extends into said chamber and to the forward end of which is affixed an outlet fitting provided with an elongated seat counterbored to provide an elongated cylindrical outlet passage, an inner tube the rear end of which is secured to the inlet fitting in communication with the compressed air passage, said inner tube extending forwardly through said chamber and through the outer tube through said seat and having a contracted forward end forming a liquid nozzle extending in closely spaced relation into the elongated cylindrical outlet passage of the outlet fitting to provide between the liquid nozzle and said cylindrical passage an annular liquid outlet orifice of relatively small cross sectional area.

References Cited in the file of this patent

UNITED STATES PATENTS

| | | |
|---|---|---|
| 1,016,145 | Harker | Jan. 30, 1912 |
| 2,497,101 | Starr | Feb. 14, 1950 |
| 2,577,025 | Lundberg | Dec. 4, 1951 |
| 2,577,437 | Stringer | Dec. 4, 1951 |
| 2,580,780 | Hirshon | Jan. 1, 1952 |
| 2,595,826 | Winks | May 6, 1952 |
| 2,635,010 | Sanders | Apr. 14, 1953 |
| 2,640,753 | Morris et al. | June 2, 1953 |